Feb. 6, 1940.  L. C. STRUENSEE  2,189,453

FOUR-WHEEL TRAILER HITCH

Filed Feb. 28, 1938

Inventor.
Louis C. Struensee

By
Attorneys.

Patented Feb. 6, 1940

2,189,453

UNITED STATES PATENT OFFICE 2,189,453

FOUR-WHEEL TRAILER HITCH

Louis C. Struensee, Oshkosh, Wis.

Application February 28, 1938, Serial No. 193,011

1 Claim. (Cl. 280—33.55)

This invention pertains to hitches, and more particularly to novel means for connecting a trailing vehicle to a drawing vehicle, whereby such trailing vehicle will effectively track behind the towing or drawing vehicle.

One of the primary objects of my invention is to provide a trailer hitch, which will permit either a two-wheel or a four-wheel trailer to be attached to a towing vehicle, and result in steering geometry which will definitely track or trail with such towing vehicle, and thereby permit convenient use of a trailer in fields and orchards, or in close quarters or corners.

Another salient object of my invention is to provide novel means for connecting the trailer draw bar or tongue with the front and rear steering knuckles of the trailer, so that the front and rear wheels of the trailer will follow the path of the wheels of the towing or drawing vehicle.

A further important object of my invention is to provide means for permitting convenient adjustment of parts, whereby the hitch can be associated with different sizes and characters of trailers.

A further important object of my invention is to provide means for holding the steering knuckles of the trailer against swinging movement, and in direct line, when it is desired to hold the trailer in a straight path.

A still further object of my invention is to provide a steering trailer hitch of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
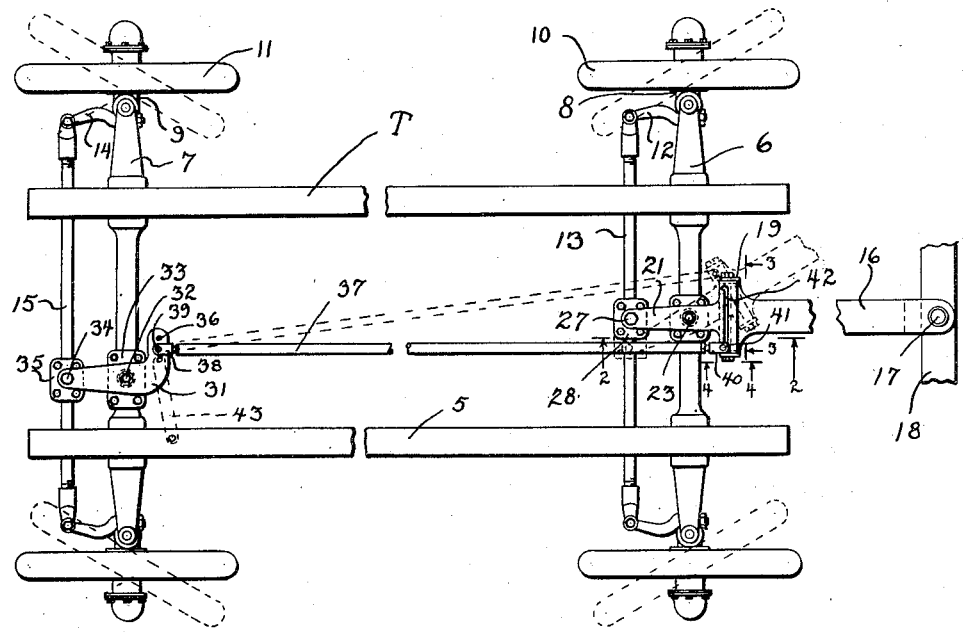
Figure 1 is a top plan view of the chassis of a trailer, showing my novel steering hitch incorporated therewith.
Figure 2:
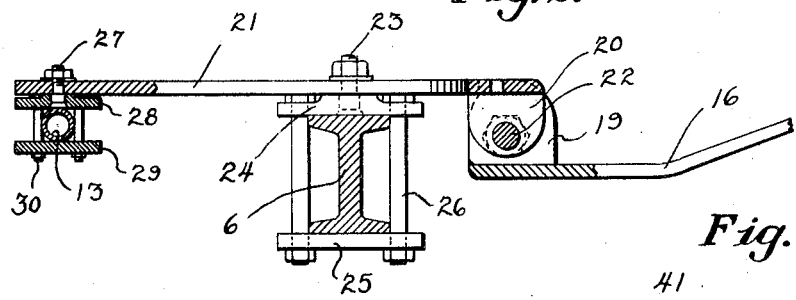
Figure 2 is an enlarged fragmentary, detailed longitudinal section taken on the line 2—2 of Figure 1, looking in the direction of the arrows.
Figure 3:
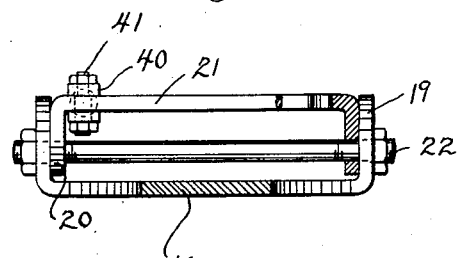
Figure 3 is a fragmentary, transverse, sectional view through the hitch, taken on the line 3—3 of Figure 1 looking in the direction of the arrows.
Figure 4:
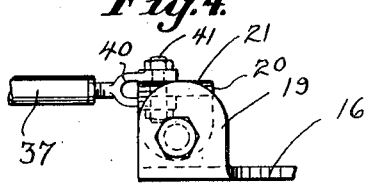
Figure 4 is a fragmentary, detailed, side elevational view illustrating the connection between the draw bar operating the lever and the drag link.

Referring to the drawing in detail, wherein similar reference characters designate corresponding parts throughout the several views, the letter T generally indicates a trailer, which can be of any preferred character or size. As illustrated, the trailer T includes the longitudinally extending, spaced, parallel frame bars 5, having connected therewith the front and rear dead axles 6 and 7. The ends of the axles 6 and 7 carry respectively steering knuckles 8 and 9 for the front and rear wheels 10 and 11. The front steering knuckles 8 have formed thereon, or rigidly secured thereto, rearwardly extending steering crank arms 12, which are connected together by a tie rod 13. The rear steering knuckles 9 are likewise provided with rearwardly extending steering arms 14, which are operatively connected together by means of a tie rod 15.

Extending forwardly from the trailer T is the draw bar or tongue 16, which is rigidly connected by means of a pin or other suitable device 17, with the rear bumper, frame, or axle 18 of a towing or drawing vehicle. The rear end of the draw bar 16 is winged and provided with a pair of transversely alined pivot ears 19. These ears receive therebetween a pair of depending pivot ears 20 formed on the forward end of the T-shaped steering lever 21. A pivot bolt 22 extends through the pivot ears 19 and 20 for pivotally connecting the draw bar with the steering lever, so that the draw bar can swing upwardly and downwardly.

At a point intermediate its ends the steering lever 21 is pivotally mounted upon a pivot stud 23, which can be carried by a clamp plate 24. This clamp plate 24 is rigidly connected to the front axle 6 in any preferred manner, such as by the use of a bottom clamp plate 25 and bolts 26, forming a clip adjustably secured to the axle 6.

The extreme rear end of the steering lever 21 has pivotally connected to the front tie rod 13 a pivot stud 27. This pivot stud 27 can be carried by a clamp or clip plate 28. The clamp plate 28 is in turn firmly secured to the tie bar by any desired means, such as by a lower clamp plate and bolts 30. Obviously, upon movement of the draw bar 16 with the towing vehicle the steering lever 21 will be moved on its pivot 23, and this movement will be transferred to the tie rod 13. The tie rod 13 will move the front wheels 10 in unison.

The rear tie rod 15 is operatively connected to the T-shaped steering lever 21 by means which will now be described so that the rear wheels will be moved in the proper direction to allow the correct tracking of said rear wheels. This means includes a substantially bell-crank shaped lever 31 rockably mounted intermediate its ends on a stud 32. This stud may be formed on or secured to a clamp plate 33, which is in turn rigidly connected to the rear axle 7. The outer end of the rear arm of the bell crank 31 is connected by means of a pivot stud 34, with a clamp plate 35, which is rigidly secured to the rear tie rod 15.

The front arm of the bell-crank can be provided with a plurality of openings 36, for a purpose which will be later set forth. A drag link or rod 37 is employed for connecting the front arm of the bell crank with the front end of the lever 21, and the rear end of the drag link or rod 37 carries a yoke 38 for straddling the crank 31. A pivot pin or bolt 39 is placed through the yoke and in a selected opening 36. The front of the drag rod or link 37 carries a similar yoke 40 for straddling the front end of the T-shaped steering lever 21 at one side of its longitudinal center, and the yoke 40 is connected to said lever 21 by means of a pivot bolt 41. It is desirable to connect the yokes 38 and 40 with the terminals of the drag rod 37 by means of an adjustment mechanism, whereby the length of the drag rod or link 37 can be regulated.

As shown in Figure 1 of the drawing, the drag link 37 is connected to the head of the link 21 on the righthand side of the longitudinal axis of the lever 21. Hence, upon swinging movement of the lever 21 the crank 31 will be turned in such a manner as to move the rear wheels 11 to the right. By this arrangement and construction of parts, the front and rear wheels will be moved synchronously in the proper direction to bring about the correct tracking of the drawing vehicle.

In certain instances, such as during the backing of the trailer, it may be desirable to have the rear wheels moved in the same direction with the front wheels. In this case the yoke 40 is moved to the left-hand side of the head of the T-shaped lever 21, as shown in dotted lines in Figure 1 of the drawing.

To allow adjustment in a convenient manner, the head of the T-shaped lever 21 can be provided with a slot 42, so that the yoke can be slid to one side of the head, or to the other.

In some instances, it may be highly desirable to lock all of the wheels against swinging movement. This can be conveniently accomplished by securing a locking lever 43 (shown in dotted lines in Figure 1) to one of the chassis beams 5, and to the crank 31.

From the foregoing description it will be noted that this trailer attachment is adapted to be readily assembled upon the standard elements of a trailer having the four wheels arranged for steering. Briefly, the invention can be applied to the front and rear axles and associated steering arms and tie rods without the aid of a skilled mechanic, due to the fact that the pivot bolts are clipped to said axles and tie rods.

From the foregoing description, it can be seen that I have provided an exceptionally simple and durable mechanism for bringing about the proper tracking of a trailer vehicle behind a towing vehicle.

Changes in details may be made without departing from the spirit or scope of this invention, but what I claim as new is:

In a four-wheel steering trailer having front and rear linked steering knuckles; the combination of a draft mechanism including, a flat T-shaped head, the cross-arm of which is slotted at a right angle to the stem of the head, pivot clips for securing the stem of the head to the vehicle axle and associated steering knuckle link, ears folded downwardly from the cross-arm of the head, a drawbar having upwardly folded ears in pivotal union with the ears of the cross-arm, and a rod in lever connection with the link of the rear wheel steering mechanism, the front end of the rod being adjustably pivoted in the slot of the cross-arm, whereby said rod is slidably adjusted upon either side of the pivot of the T-shaped head to predeterminedly regulate the degree of movement of the rear steering knuckles and the direction of said movement.

LOUIS C. STRUENSEE.